United States Patent [19]

Hanyuda et al.

[11] 4,119,617

[45] Oct. 10, 1978

[54] CURABLE RESINOUS COMPOSITION COMPRISING AN UNSATURATED CYCLOACETAL COMPOUND AND A POLYTHIOL COMPOUND

[75] Inventors: Toshiaki Hanyuda, Yokohama; Haruyuki Kanehiro, Kawasaki; Kojiro Mori, Tokyo; Eiichiro Takiyama, Kamakura, all of Japan

[73] Assignee: Showa Highpolymer Co., Ltd., Tokyo, Japan

[21] Appl. No.: 819,751

[22] Filed: Jul. 26, 1977

[30] Foreign Application Priority Data

Jul. 28, 1976 [JP] Japan .................................. 51-89048

[51] Int. Cl.² .................................. C08F 28/06
[52] U.S. Cl. .................................. 528/360; 526/266; 526/268; 526/270; 260/873; 260/874; 528/293; 528/364; 528/226; 528/192; 528/205; 528/374
[58] Field of Search .............. 260/79.5 C, 79.7, 67 S, 260/67 UA, 67 UC; 526/266, 268, 270

[56] References Cited

U.S. PATENT DOCUMENTS

| | | | |
|---|---|---|---|
| 2,601,572 | 6/1952 | Thomas et al. | 526/270 |
| 2,902,476 | 9/1959 | Kern et al. | 526/266 |
| 2,913,434 | 11/1959 | Guest et al. | 526/266 |
| 2,996,516 | 8/1961 | Guest et al. | 526/266 |
| 3,087,918 | 4/1963 | Guest et al. | 260/67 UC |
| 3,278,635 | 10/1966 | Bastian | 260/67 S |
| 3,311,674 | 3/1967 | MacArthur | 260/67 UC |
| 3,716,466 | 2/1973 | Hook | 260/79.7 |
| 3,893,985 | 7/1975 | Papa et al. | 260/67 UA |

*Primary Examiner*—Ronald W. Griffin
*Attorney, Agent, or Firm*—Wenderoth, Lind & Ponack

[57] ABSTRACT

This invention relates to a resinous composition curable to an insoluble and infusible resin, which comprises: (i) a compound having at least 2 or more unsaturated cycloacetal groups per molecule, expressed by the formula,

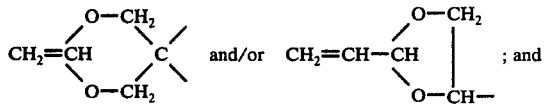

(ii) a compound having at least 2 or more mercapto groups (—SH) per molecule, said compound (i) and compound (ii) being mixed in the functional group ratio of 1 : 0.5 - 1.7 and the average total number of the unsaturated cycloacetal groups and mercapto groups being 4 or more.

6 Claims, No Drawings

CURABLE RESINOUS COMPOSITION COMPRISING AN UNSATURATED CYCLOACETAL COMPOUND AND A POLYTHIOL COMPOUND

DETAILED EXPLANATION OF THE INVENTION

This invention relates to a curable resinous composition, more particularly a curable resinous composition comprising an unsaturated cycloacetal compound and a polythiol compound as the main components.

It is well known that a sulfide compound is formed by the addition reaction of a carbon-carbon unsaturated compound with a mercapto compound, and it is also well known that a thermoplastic resin is synthesized by this process. Examples of this addition reaction include the reactions of diolefin with dimethyl mercaptane; bisacryl amide or bisacrylic acid ester with dimercaptane; divinyl urethane or divinyl diurea with dimercaptane; diallyl ester with dimercaptane; and the like.

In order to facilitate the addition reaction, the reaction is carried out generally in the presence of a peroxide catalyst or under ultra-violet light radiation.

Recently, a curable resinous composition comprising a polyene and a polythiol has been reported. This composition is curable particularly under ultra-violet light radiation to form a film which can be used for preparing a printing plate. This composition contains diallyl phthalate and its prepolymer, triallyl isocyanurate and a polyallyl urethane compound as a polyene from among carbon-carbon unsaturated compounds.

We have studied the utility of unsaturated cycloacetal compounds prepared by the condensation of a polyhydric alcohol with an unsaturated aldehyde such as acrolein, for example diallylidene pentaerythritol (hereinafter referred to as DAPE) prepared by the condensation of acrolein with pentaerythritol; triallylidene sorbitol (TAS) prepared by the condensation of acrolein with sorbitol; monoallylidene trimethylol ethane (MATME) prepared by the condensation of acrolein with trimethylol ethane; monoallylidene trimethylol propane prepared by the condensation of acrolein with trimethylol propane; diallylidene 2,2,6,6-tetramethylol cyclohexanone (DACH) prepared by the condensation of acrolein with 2,2,6,6-tetramethylol cyclohexanone and the like.

DAPE

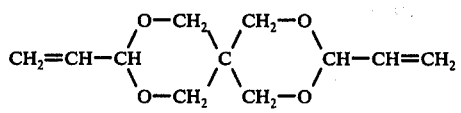

TAS

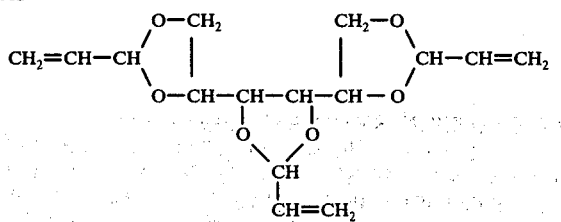

MATME

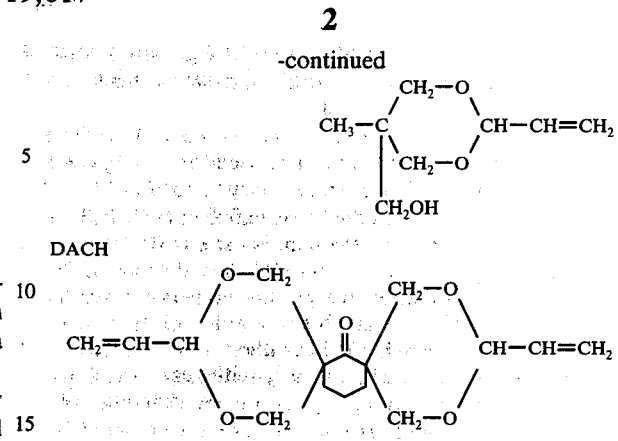

DACH

The above mentioned unsaturated cycloacetal compounds are highly reactive chemcially but they have not been substantially used for industrial purposed. We have developed the use of the unsaturated cycloacetal compounds as a modifier for various curable resins such as unsaturated polyester resin, epoxy resin, epoxy acrylate resin, methacrylic resin, urethane resin and the like to prepare fiber glass reinforced plastics (FRP), adhesives, paints curable under ultraviolet light, potting material for electric instruments, bulk molding compounds and the like.

There are few prior art publications relating to sulfide resin using the above unsaturated cycloacetal compounds as a polyene. The prior art publications merely reveal fusible oligomers obtained by the reaction of DAPE with hydrosulfide or thioglycol,, which oligomers are mainly used as vulcanizing accelerators. There is substantially no prior art relating to the use of unsaturated cycloacetal and sulfide compounds for curable resins. That is, heretofore, the reactivities between various unsaturated cycloacetal groups and mercapto groups has not been fully studied.

However, we have discovered that these compounds can be effectively used to modify generally used unsaturated polyester resin, epoxy resin, urethane resin and the like for the purpose of improving the curability and physical properties of these resins. Actually, the resins modified in accordance with the present invention provide much better physical properties and curability than in the case of using the above mentioned diallylphthalate or triallylisocyanurate.

For example, in the case of the conventional UV curable paints such as unsaturated polyester resins and various acryl type oligomers, hardness and adhesiveness of the resins are not well balanced, particularly when the substrate to be coated has a non-absorptive surface, while the resinous composition of this invention is remarkably improved in this respect.

There is a recent report that the azo complex of a Lewis acid used as a curing agent improves the balance between adhesiveness and hardness of epoxy resin. However, this causes foaming at the time of curing and therefore its utility is extremely restricted. On the other hand, the resinous composition of the present invention does not have such a defect. As compared with the system using diallylphthalate or triallylisocyanurate as a polyene, the resinous composition of this invention using the unsaturated cycloacetal compounds is excellent with regard to curing rate and adhesiveness, and is particularly photo-curable without using a photosensitizer which often impairs weather resistance. In addition to this advantage, the resinous composition of this invention is easily curable by a radical generator such as organic peroxides and the like, and the curing is not inhibited by the presence of air.

Unsaturated polyester resin is known as a radical polymerizable resin which can be used for casting compounds and FRP. However, ordinary unsaturated polyester retains a large residual stress after cure skrinkage. This results in lowering the bonding strength, deformation and fragility of the resin. ON the other hand, the resinous composition of the present invention does not retain a residual stress after curing although the curing rate of this resin is high. Thus, the resinous composition of this invention is satisfactory with regard to residual stress as in the case of epoxy resin or urethane resin.

Another advantage is that the resinous composition of this invention can be easily cured at room temperature by means of an acid catalyst although this is impossible in the system using diallylphthalate in place of unsaturated cycloacetal. When the resinous composition of this invention is generally used as FRP, casting compound, paint, ink, adhesives and the like, the above advantage is in accord with the campaign of saving energy and preventing environmental pollution.

That is, the resinous composition of this invention can be used in the fields of coating materials, ink, FRP, adhesives, casting compounds and the like by means of one or more curing techniques such as the use of an acid catalyst, radical generator or active energy ray, for example, ultraviolet ray (UV ray).

The present invention is more fully described with regard to the individual components of the resinous composition. The first component is a compound obtained by the condensation of an unsaturated aldehyde (generally acrolein) with polyhydric alcohol and has, per molecule, two or more groups expressed by the following chemical formula:

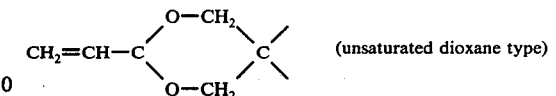 (unsaturated dioxane type)

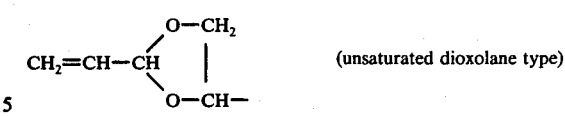 (unsaturated dioxolane type)

Typical examples of this component include DAPE, TAS and DACH. The molecular chain length of this component may be modified as in the case of epoxy resin by reacting, for example DAPE, with a compound having 2 or more hydroxyl groups or mercapto groups (containing active hydrogen) in a molecule. Taking ethylene glycol or dithioglycol for instance, this modification can be illustrated by the following chemical formula:

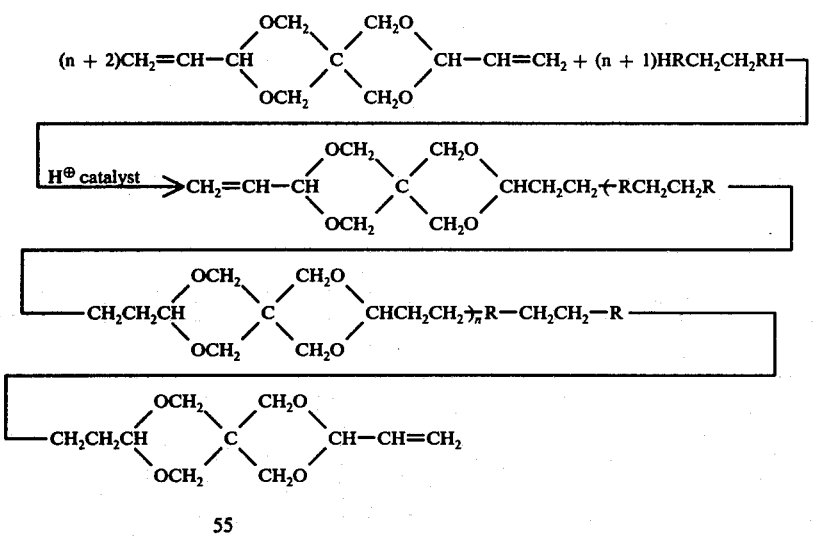

(wherin R represents O or S atom and n is an integer of 0, 1, 2, 3, ...) In the case of phenol having active hydrogen on a benzene ring in place of the above mentioned compounds having hydroxyl groups or mercapto groups, the above modification is illustrated by the following chemical formula:

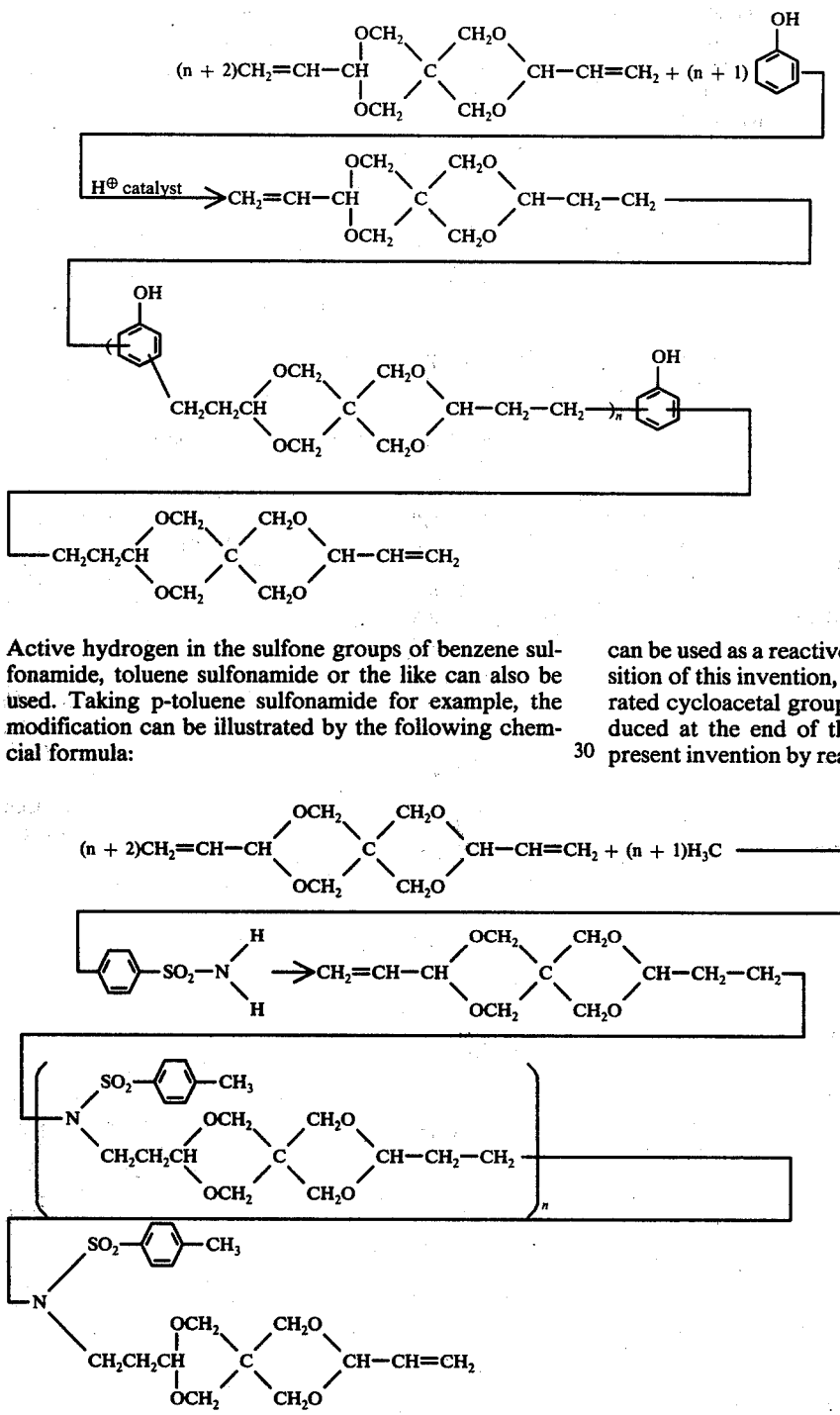

Active hydrogen in the sulfone groups of benzene sulfonamide, toluene sulfonamide or the like can also be used. Taking p-toluene sulfonamide for example, the modification can be illustrated by the following chemcial formula:

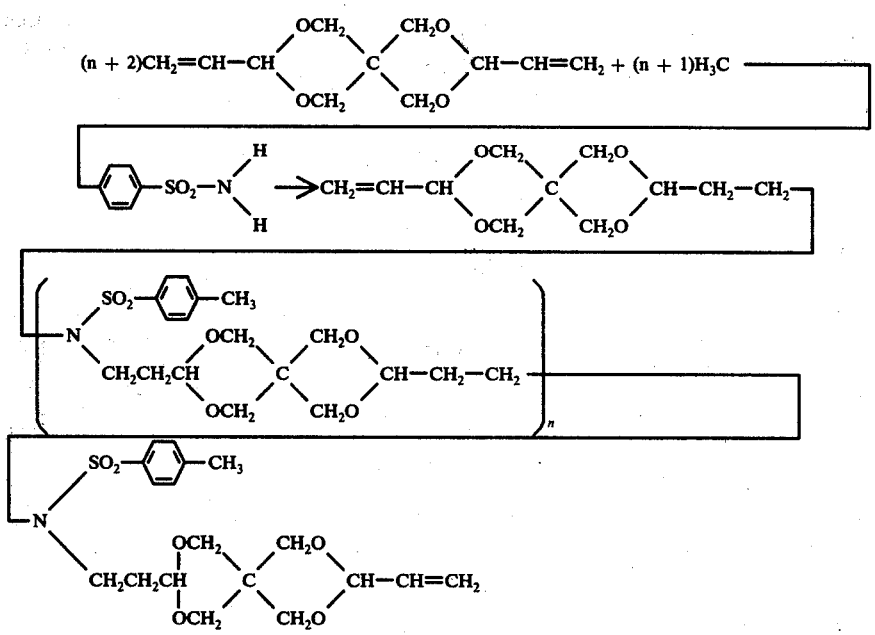

Monounsaturated cycloacetal compounds having the following chemical formula obtained by reacting acrolein with glycerine, trimethylolpropane or the like

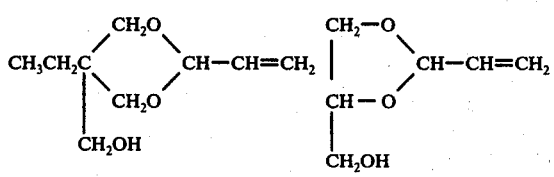

can be used as a reactive diluent for the resinous composition of this invention, and at the same time the unsaturated cycloacetal group of this compound can be introduced at the end of the molecule of the resin of the present invention by reacting the hydroxyl group of this compound with carboxylic anhydride or dicarboxylic acid (esterification or halfesterification reaction) or with an isocyanate group.

Compounds having 2 or more hydroxyl groups (includes —OH groups derived from carboxylic acid) and/or mercapto groups (—SH) as active hydrogen used in the above mentioned modification include polyol, polythiol, arylsulfonamide, phenol and the like, but are not limited thereto.

Typical examples of polyol include ethylene glycol; diethylene glycol; triethylene glycol; propylene glycol; dipropylene glycol; 1,3-butanediol; 1,6-hexanediol;

polyethylene glycol 400; hydrogenated bisphenol A; bisphenol A-ethylene oxide adduct; bisphenol A-propylene oxide adduct; trimethylolpropane; trimethylolethane; pentaerythritol; dipentaerythritol; ethylene oxide or propylene oxide adduct of phthalic acid, isophthalic acid or terephthalic acid. Polyester having terminal hydroxyl groups and having a molecular weight of 1500 or less can also be used in the same manner.

Typical examples of polythiol include dithioglycol; dipentenedimercaptane; ethylcyclohexyldimercaptane; 1,6hexanedimercaptane; and the like. The esterification products of the above glycol with thioglycolic acid, β-mercaptopropionic acid and/or mercaptosuccinic acid can also be used in the same manner.

Typical examples of phenol include phenol, cresol and their formalin condensation products such as novolak, bisphenol F, bisphenol A and the like.

Typical examples of arylsulfonamide include benzenesulfonamide; p-toluenesulfonamide; chlorobenzenesulfonamide; and the like.

Typical examples of polyisocyanate or isocyanate prepolymer used to form a urethane bond with the monounsaturated cycloacetal having a hydroxyl groups such as MATME include tolylene diisocyanate, PAPI (poly(alkylene arylisocyanate) manufactured by Kasei Upjohn Co.), methaphenylene diisocyanate, xylylene diisocyanate, hexamethylene diisocyanate, isophorone diisocyanate and the like.

Typical examples of acid anhydride used to form an ester or half-ester with monounsaturated cycloacetal include succinic anhydride, maleic anhydride, itaconic anhydride, phthalic anhydride, tetrahydrophthalic anhydride, hexahydrophthalic anhydride, HET anhydride and the like. The half ester prepared in this reaction may be modified with polyglycidyl ether type epoxy; diglycidyl ester type epoxy of phthalic acid, adipic acid, dimer acid and the like; or polyol. MATME may be used as an addition product with styrene-maleic acid resin or hexene-maleic acid resin.

The second component of the resinous composition of the present invention is aliphatic or aromatic mercaptanes having 2 or more mercapto groups in a molecule. Typical examples of this second component include dipentene dimercaptane; ethylcyclohexyl dimercaptane; 1,6-hexane dimercaptane; the ester product of a mercapto compound having a carboxyl group with a polyol, for example the esterification products of thioglycolic acid, β-mercaptopropionic acid or mercaptosuccinic acid (HOOCCH$_2$CHSHCOOH) with polyols such as trimethylolpropane, trimethylolethane, pentaerythritol or dipentaerythritol. Other examples include compounds having a mercapto group and a hydroxyl group at the β-position carbon with respect to the mercapto group; compounds obtained by the reaction of epoxy resin and hydrogen sulfide; and compounds obtained by the reaction of epoxy resin and thioglycolic acid.

The functional group ratio (i.e. the chemical equivalent ratio) of the unsaturated cycloacetal group-containing compound to the mercapto group-containing compound is 1 : 0.5-1.7, preferably 1 : 0.8-1.2, most preferably about 1 : 1. If the chemical equivalent ratio of the two components of the resinous composition is outside of the above range, the resinous composition does not fully cure. Particularly, if the cycloacetal group is excessive, the curing rate of the resinous composition is retarded, and if the mercapto group is excessive, offensive smell is generated and physical properties are lowered. This mixing ratio of the two components is determined by physical properties and infrared spectroscopic analysis.

In order to prepare curable resin, the total number of unsaturated cycloacetal groups per molecule of the cycloacetal group-containing compound and mercapto groups per molecule of the mercapto group-containing compound must average 4 or more, preferably 5 or more.

As mentioned above, the resinous composition of the present invention is practically cured by the use of an acid catalyst, radical generator or active energy ray source, particularly ultra-violet ray.

Examples of an acid catalyst include polyphosphoric acid, phosphoric acid, trifluoroacetic acid, p-toluene sulfonic acid, boron trifluoride complex, metal halides such as $SnCl_4$, $ZnCl_2$ and the like. The amount of the acid catalyst used varies depending on the curing temperature, but generally is 0–5 parts preferably 0.01–2 parts, per 100 parts of the resinous composition.

Examples of a radical generator include organic peroxides and the like having various decomposition temperatures depending on the curing temperature, and the amount of the radical generator used is 0.01–5 parts per 100 parts of the resinous composition. If the curing temperature is not higher than 100° C., azobisisobutyronitrile is particularly effective since it is a fast-curing agent. However, azobisisobutyronitrile sometimes causes foaming, and therefore it should preferably be used in an amount of 0.05–0.5 part per 100 parts of the resinous composition.

Examples of an ultra-violet ray generating source (generating light of a wave length of 150–450 nm) include a carbon arc, xenon lamp, mercury lamp (particularly a high pressure mercury lamp) and pulse system instantaneous drying apparatus for photo-polymerizable paint (IST dryer manufactured by Taiheiyo Kinzoku K.K.). The latter two apparatuses are now widely used for curing paint or ink of unsaturated polyester resin or acrylic resin, and they are practical.

The addition of a photo-sensitizer is not necessary, but a photo-sensitizer such as a ketone type compound, disulfide type compound, diazo type compound or the like may be used in order to enlarge a photo-sensitive zone.

Depending on the use, the following ingredients may optionally be incorporated with the resinous composition of this invention to such an extent as not to impair the essential features of the resinous composition: another prepolymer, polymer, reactive of nonreactive diluent, solvent, extender, filler, dye, pigment, antifoaming agent, silane coupling agent, thixotropic agent, reinforcing material (such as glass fiber and carbon fiber), air-oxidation inhibitor, polymerization inhibitor, pH adjustor and the like.

This invention is further illustrated by the following Examples.

EXAMPLE 1-a (Example for curing by U.V.)

The curabilities of the following resinous compositions were measured by means of the ultraviolet-curing process. The ultraviolet-emitting means used in this process was a high pressure mercury lamp having an effective power of 80 watts per cm of effective tube length manufactured by Iwasaki Denki K.K. The lamp was placed at a position 15 cm from a resinous composition to be cured and operated at varying line speed in an atmosphere of air.

All the cycloacetal compounds were prepared according to the process disclosed in J. Org. Chem 25, 319 (1960).

A resinous composition was prepared by dissolving 21.2 g (0.1 mol) of diallylidene pentaerythritol (DAPE)

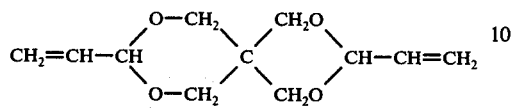

in 22.7 g (0.05 mol) of pentaerythritol tetramercaptoacetate

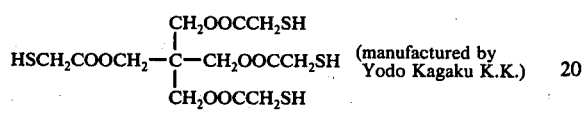 (manufactured by Yodo Kagaku K.K.)

having a purity of 95%. The resinous composition thus prepared was coated on a tin plate (manufactured by Japan Test Panel K.K.) to a thickness of 25 μ, and was cured by two radiations under the above mentioned mercury lamp at a line speed of 13 m/min. According to infrared spectroscopic analysis, the absorption by SH group (2570 cm$^{-1}$) in the cured resinous composition disappeared, and this fact means that pentaerythritol tetramercaptoacetate was completely reacted without a photosensitizer. The pencil hardness (using a Mitsubishi Uni pencil) of the cured composition was H. The cross cut test using an adhesive cellophane tape was 100/100, thus the adhesiveness being excellent.

In order to make a comparison, commercially available diallylphthalate monomer (DAP) 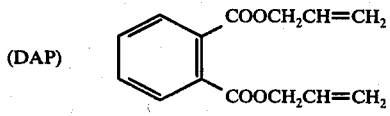

and pentaerythritol tetramercaptoacetate were mixed and dissolved together in the same chemical equivalent ratio as in the case of DAPE, and the resinous composition was coated on a tin plate and subjected to radiation from the mercury lamp in the same manner as mentioned above. However, the resinous composition was substantially uncured, and therefore the physical properties could not be measured. According to infrared spectroscopic analysis, only a small amount of the SH was reduced. This resinous composition was not cured in the same manner as the DAPE-containing resinous composition until 5 phr of benzophenone was added as a sensitizer. The pencil hardness was B, and the adhesiveness was poor in relation to the resinous composition of this invention.

EXAMPLE 1-b

A resinous composition was prepared by mixing 29.7 g (0.1 mol) of triallylidene sorbitol (TAS) 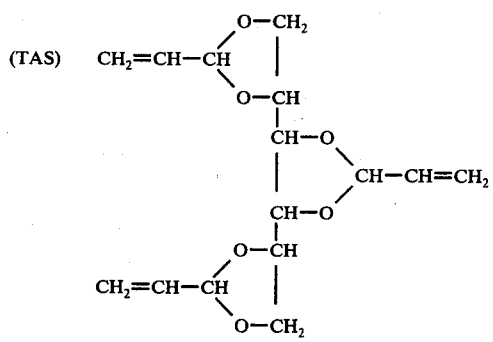

37.5 g (0.1 mol) of trimethylol propane trimercaptoacetate

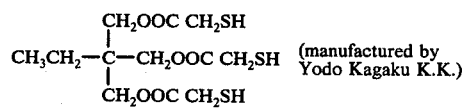 (manufactured by Yodo Kagaku K.K.)

having a purity of 95.1%. The resinous composition thus prepared was mixed with 5 phr of benzophenone and the resultant mixture was cured by two radiations under the above mentioned mercury lamp at a line speed of 15 m/min. The pencil hardness of the cured resinous composition was 2 H, and the cross cut test was 83–87/100.

In order to make a comparison, commercially available triallyl isocyanurate (TAIC) 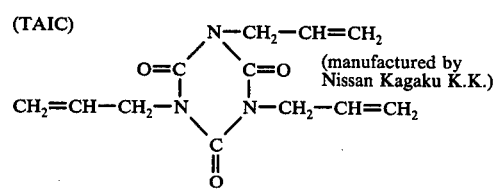 (manufactured by Nissan Kagaku K.K.)

was used in place of TAS. The resinous composition containing 5 phr of benzophenone was coated on a tin plate and the coated film was cured by two radiations, but the cross cut test was 0–6/100. Thus the adhesiveness was very poor. The pencil hardness was H.

EXAMPLE 2 (Example for curing by radical generator)

As an example of curing by a radical generator, a resinous composition comprising 212 g (1 mol) of DAPE, 227.4 g (0.5 mol) of pentaerythritol tetramercaptoacetate (manufactured by Yodo Kagaku K.K.) and 0.3 phr of azobisisobutyronitrile was prepared, and the composition was cured at 65° C. for 2 hours. The pencil hardness of the cured resinous composition was H, and the Barcol hardness (soft type) was 57. The adhesiveness of the coated film (thickness = 0.2 mm) to a steel plate was excellent, and the film was not released even when it was bent at an angle of 180° C. around a mandrel having a diameter of 1 mm.

Various physical properties of a cast product having a thickness of 3 mm prepared by using this resinous composition were measured and the results are shown as follows:

bending test according to JIS 6919 Method: not broken bending modulus: 150 kg/mm$^2$ tensile strength: 5.0 kg/mm²
tensile modulus: 380 kg/mm²
adhesive strength under tension and shear between stainless steels: 146 kg/cm²
adhesive strength under tension and shear between steels: 170 kg/cm²
water absorption at room temperature: 0.2%
dielectric constant (1 MHz): 3.45
tan δ (1 MHz): 0.02
dielectric strength: 10 kv/mm or higher
insulation resistance: 10¹⁵ ohm or higher
weathering test; subjected to a dew cycle weatherometer for 150 hours (corresponding to one year exposure to natural weather):
gloss retention = 96%, excellent.

The above data proves that the resinous composition of this invention has excellent properties suitable for use as general purpose semirigid resin, fiber reinforced plastics and potting compounds for electric instruments.

On the other hand, the resinous product obtained by curing a resinous composition containing DAP in place of DAPE in the same manner as above and further post-curing the composition at 120° C. for 2 hours was not fully cured and had a tensile strength of 0.04 kg/mm² and tensile modulus of 0.5 kg/mm².

EXAMPLE 3 (Example for curing by acid catalyst)

The same resinous composition as in Example 2 was prepared, except that the azobisisobutyronitrile was replaced by 0.3 phr of p-toluenesulfonic acid. The resinous composition thus prepared was cured at room temperature, and after 3 days, the Barcol hardness (soft type) of the cured composition was 55. The composition was then post-cured at 120° C. for 2 hours. The post-cured composition had a pencil hardness of 2 H, hard type Barcol hardness of 30 and soft type Barcol hardness of 72.

On the other hand, the resinous composition containing DAP in place of DAPE gelled but did not cure even in the presence of an acid catalyst.

Various physical properties of a cast product prepared by using the resinous composition containing DAPE of this invention are as follows:
bending test according to JIS 6919 Method: not broken
bending modulus: 345 kg/mm²
tensile strength: 7 kg/mm²
tensile modulus: 410 kg/mm²
dielectric constant (1 MHz): 3.62
tan δ (1 MHz): 0.03
arc resistance: 112 sec.
cracking resistance: 51 drops or more at 600 V
dielectric strength: 10 kv/mm or higher EXAMPLE 4 (Example for curing by U.V.)

150 g (0.88 mol) of

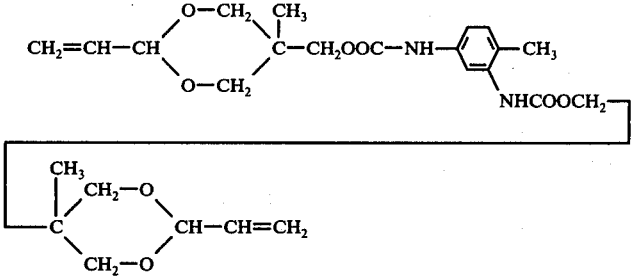

was reacted with 76 g (0.44 mol) of tolylene diisocyanate at 40° C. for 5 hours. According to infrared spectroscopic analysis, the absorption by the isocyanate group (2270 cm⁻¹) disappeared and it was proved that urethane groups were formed. Judging from the above infrared spectroscopic analysis and the iodine value, it was estimated that the above reaction product was the compound having the following chemical structure:

1000 ppm of hydroquinone was mixed with 26 g (0.05 mol) of the above reaction product and 30 g (SH amount = 0.1 equivalent) of polyhydroxy polymercapto compound (trade name: DPM3-800LC, manufactured by Diamond Shamrock Corp.).

The resinous composition thus prepared was coated to a thickness of 5μ or less on a paper printed with epoxy acrylate type resin as a UV printing ink vehicle (trade name: Ripoxy SP-5003, SP 1563 X-3, manufactured by Showa Highpolymer Co., Ltd.). The printed paper thus coated was cured in the same manner under the same mercury lamp as used in Example 1. The cured surface was highly glossy and was completely adhered to the printed surface.

EXAMPLE 5 (Example for curing by U.V.)

A mixture of 86 g (0.5 mol) of MATME, 50 g (0.5 mol) of succinic anhydride, 0.3 phr of lithium chloride and 0.05 phr of toluhydroquinone was reacted at 110° C. for 3 hours to form a half ester. To the half ester, was added 85 g (0.25 mol) of bisphenol A-glycidyl ether type epoxy resin (sold under the trade name of "Epikote 827" by Shell Chemical Corp.) having an epoxy equivalent of 187, and the resultant mixture was reacted at 120° C. for 2 hours and 20 minutes to produce an ester having an acid value of 4.6. According to infrared spectroscopic analysis, epoxy groups disappeared and it was estimated that the reaction product was the compound having terminal allylidene groups expressed by the following chemical formula:

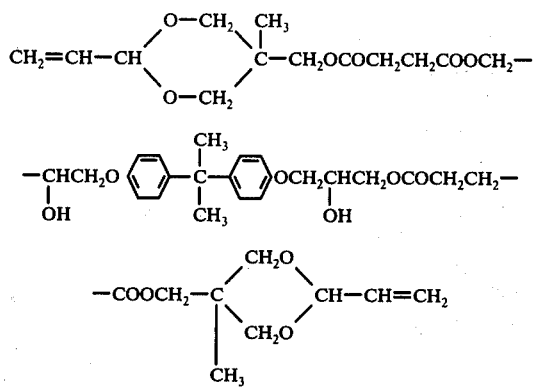

A mixture of 44.2 g (0.05 mol) of this reaction product, 12.6 g (0.033 mol) of trimethylolpropane trimercaptoacetate and 2 phr of benzoyl peroxide was coated on a paraffintreated glass plate to a thickness of 0.2 mm, and was cured by three radiations under the mercury lamp used in Example 1 at a line speed of 15 m/min. The cured film was separated from the glass plate by hot water treatment and was dried. The dried film showed an elongation of about 100% when elongated.

EXAMPLE 6 (Example for curing by acid catalyst)

424 g (2 mols) of DAPE and 106 g (1 mol) of diethylene glycol were reacted at 80° C. for 90 minutes in the presence of 0.3 phr of p-toluene sulfonic acid as a catalyst. The reaction product thus obtained had an iodine value of 103.5 (corresponding to 92% of the theoretical iodine value), and was estimated to have the following chemical formula:

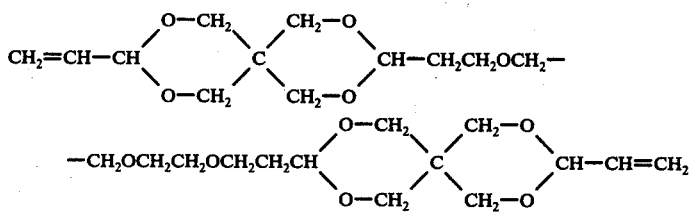

The reaction product was then cooled. 265 g (0.5 mol) of this reaction product was mixed with 125.1 g (0.33 mol) of trimethylolpropane trimercaptoacetate and 0.3 phr of p-toluene sulfonic acid. The resultant mixture was then cured at 40° C., and further post-cured at 100° C. for 2 hours.

Physical properties of the cured product were as follows:
tensile strength: 0.87 kg/mm²
tensile modulus: 3.9 kg/mm²
breaking elongation: 94% The above resinous composition having 80 phr of "Cristallite A" (manufactured by Tatsumori K.K.) added thereto as silica powder can be effectively used as a potting compound having excellent crack resistance for electric instruments.

EXAMPLE 7 (Example for curing by U.V.)

A mixture of 64 g (0.3 mol) of DAPE, 9.4 g (0.1 mol) of phenol and 0.5 phr of p-toluene sulfonic acid was reacted at 80° C. for 2 hours to prepare a viscous resinous solution. According to gas chromatography analysis, substantially all of the free phenol was reacted and it was estimated that the product had the following chemical structure:

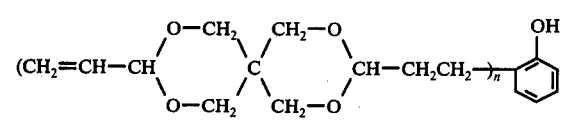

(wherein $n = 3$)

This reaction product was neutralized with sodium ethylate, and 15 g (0.02 mol) of the reaction product thus treated was mixed with 11.6 g (0.025 mol) of pentaerythritol tetramercaptoacetate and 4 g (0.023 mol) of monoallylidene trimethylolpropane (MATMP) (as a reactive diluent). 2 phr of benzoinisopropylether was added to the above mixture and the mixture was coated to a thickness of 25μ on a phenolic laminate having copper foil bonded thereto. The resinous mixture on the laminate plate was then cured by three radiations under a pulse system IST apparatus (manufactured by Taiheiyo Kinzoku K.K.) at a line speed of 30 m/min. The cured film on the laminate was then floated on solder melted at 260° C. three times for 5 seconds each, but the cured film was not swollen, thus proving excellent heat resistance.

The same results as above were obtained with regard to a mixture of 15 g (0.02 mol) of the above mentioned reaction product, 12.4 g (0.025 mol) of pentaerythritol tetramercaptopropionate (purity = 96.6%, manufactured by Yodo Kagaku K.K.) having the following chemical formula:

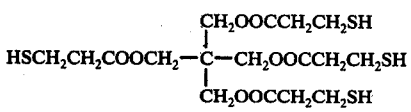

and 5 g (0.032 mol) of diethyl phosphite (as a reactive diluent).

EXAMPLE 8 (Example for curing by acid catalyst)

Two layers of glass fiber (EMC-450, manufactured by Nittoh Boseki K.K.) were impregnated with the resinous composition prepared in Example 3, and cured at 120° C. for 2 hours. Physical properties of the laminate board thus prepared (glass content = 34–35% by weight) were as follows:
bending strength: 16–18 kg/mm²
bending modulus: 680–750 kg/mm²
The above physical property values were almost equivalent to or higher than those for the laminate (glass content = 34–35% by weight) prepared by using a commercially available epoxy acrylate type resin such as high strength FRP resin (trade name = "Ripoxy R802," manufactured by Showa Highpolymer Co., Ltd.).

EXAMPLE 9 (Example for curing by heat without using catalyst)

85.5 g (0.5 mol) of p-toluene sulfonamide

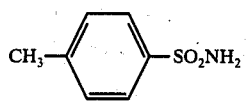

was reacted with 212 g (1 mol) of DAPE in the presence of 0.3 phr of p-toluene sulfonic acid as a catalyst at 80° C. for 1 hour. According to infrared spectroscopic analysis of the reaction product, there was no absorption with regard to H from $SO_2NH_2$. The reaction product was a crystalline compound which can be reduced to powder and which can be melted at a high temperature, and it was estimated to have the chemical structure:

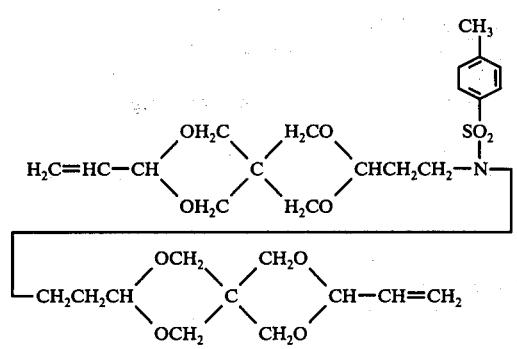

This reaction product is referred to as Compound A.
115 g (1.1 mol) of neopentyl glycol

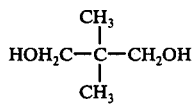

59 g (0.5 mol) of mercaptosuccinic acid and 83 g (0.5 mol) of isophthalic acid were reacted at 150° C. for 2 hours in an atmosphere of nitrogen by means of the conventional polyester synthesis technique. The temperature of the reaction system was gradually raised to 225° C., and the reaction was continued at this temperature for 12 hours, thus producing a polyester having a mercapto group in a side chain of the molecule (acid value = 31, m.p. = about 90° C.). The average molecular weight calculated on the basis of the acid value was 1810. This reaction product was estimated to have an average of five —SH groups per molecule. This polyester was referred to as Compound B.

Compound A and Compound B were respectively reduced to powder in a coffee mill. The powdered Compound A and Compound B were respectively melted at 150° C., but they did not cure. However, when 30 g (0.05 mol) of the powdered Compound A and 36 g (0.02 mol) of the powdered Compound B were mixed and melted at 150° C., the mixture cured in two minutes and became infusible.

The following composition containing Compounds A and B was intimately kneaded on a roller at 100°–105° C. to make a uniform composition and the composition was then cooled and reduced to powder to prepare molding compound.

|  | parts by weight |
|---|---|
| Compound A | 30 |
| Compound B | 36 |
| Clay #33 | 120 |
| Zinc stearate | 4 |
| 8.2 mm (⅜") glass fiber | 15 |

The above prepared molding compound was heated to 160°–165° C. for one minute per one mm thickness of the molded product. Physical properties of the molded product are shown below and prove that this is a good molding compound.

| tensile strength | 3 – 4 kg/mm² |
|---|---|
| bending strength | 8 – 11 kg/mm² |
| Charpy impact strength | 5 – 7 kg-cm/cm² |
| insulation resistance (JIS, normal state) | $10^{15}$ ohm |
| insulation resistance (JIS, after boiling for 2 hours) | $10^{12}$ ohm |
| dielectric strength | 10 – 12 kv/mm |

EXAMPLE 10 (Example for curing by acid catalyst)

280 g of styrene-maleic anhydride copolymer (mole ratio of styrene/maleic anhydride = 3/1, molecular weight = 1800), 300 g of dioxane and 120 g (0.614 mol) of monoallylidene trimethylolpropane (purity = 88%) were placed in a one liter three-necked flask equipped with a stirrer, thermometer and reflux condenser. The mixture was then refluxed at the boiling point of dioxane for 20 hours. The reaction product thus obtained was estimated to be a half ester having an acid value of 109. This reaction product has about four unsaturated cycloacetal bonds per molecule. The reaction product was then cooled to room temperature. 1 g of p-toluene sulfonic acid and 57 g (0.123 mol) of pentaerythritol tetramercaptoacetate were added to the above reaction product. The resultant mixture was used as an adhesive to bond steel with steel. The adhesive was cured at 80° C. for 30 minutes. The tensile shear bonding strength was 186 kg/cm², thus proving that this was an excellent adhesive.

What we claim is:
1. A resinous composition curable to an insoluble and infusible resin, which comprises:
   (i) a compound having at least 2 unsaturated cycloacetal groups per molecule, expressed by the formula

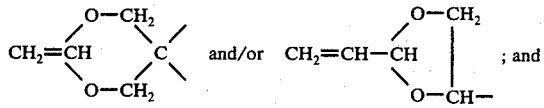

(ii) a compound selected from the group consisting of dipentene dimercaptane, ethylcyclohexyl dimercaptane, 1,6-hexane dimercaptane, and an ester product of thioglycolic acid, β-mercaptopropionic acid or mercaptosuccinic acid with a polyol,
   said compound (i) and compound (ii) being mixed in a functional group ratio of 1 : 0.5–1.7, the average total number of the unsaturated cycloacetal groups in compound (i) and mercapto groups in compound (ii) being at least 5.

2. The curable resinous composition according to claim 1, wherein said compound (i) is diallylidene pentaerythritol, triallylidene sorbitol, diallylidene 2,2,6,6-tetramethylol cyclohexanone or a mixture thereof.

3. The curable resinous composition according to claim 1, wherein said compound (i) is a reaction product of a monoallylidene trimethylol ethane and/or monoallylidene trimethylol propane with (b) a polyisocyanate compound.

4. The curable resinous composition according to claim 1, wherein said compound (i) is a half-ester product of (a) monoallylidene trimethylol ethane and/or monoallylidene trimethylol propane with (b) carboxylic acid anhydride having 2 or more acid anhydride groups per molecule.

5. The curable resinous composition according to claim 1, wherein said compound (i) is a reaction product of (a) diallylidene pentaerythritol, diallylidene 2,2,6,6-tetramethylol cyclohexanone or a mixture thereof with (b) a compound having a total of 2 or more active hydrogen-containing groups per molecule, expressed by the formula —OH and/or —SH.

6. The curable resinous composition according to claim 1, wherein said compound (i) is a reaction product of (a) an epoxy compound with (b) a half-ester product of monoallylidene trimethylol ethane and/or monoallylidene trimethylol propane with carboxylic acid anhydride having 2 or more acid anhydride groups per molecule.

* * * * *